US009525988B2

(12) United States Patent
Dwarkaprasad et al.

(10) Patent No.: US 9,525,988 B2
(45) Date of Patent: *Dec. 20, 2016

(54) METHOD AND APPARATUS FOR PERFORMING CALL SWITCHING

(71) Applicant: Samsung Electronics Co., Ltd., Gyeonggi-do (KR)

(72) Inventors: Dayama Dwarkaprasad, Gyeonggi-do (KR); Das Kumarbrata, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/676,313

(22) Filed: Apr. 1, 2015

(65) Prior Publication Data
US 2015/0208218 A1 Jul. 23, 2015

Related U.S. Application Data

(63) Continuation of application No. 13/872,798, filed on Apr. 29, 2013, now Pat. No. 9,002,332.

(30) Foreign Application Priority Data

Nov. 16, 2012 (KR) ........................ 10-2012-0130334

(51) Int. Cl.
| H04W 4/16 | (2009.01) |
| H04M 1/02 | (2006.01) |
| H04W 76/00 | (2009.01) |
| H04M 1/725 | (2006.01) |
| H04M 3/428 | (2006.01) |
| H04W 4/00 | (2009.01) |

(52) U.S. Cl.
CPC ............. *H04W 4/16* (2013.01); *H04M 1/0212* (2013.01); *H04M 1/0235* (2013.01); *H04M 1/0241* (2013.01); *H04M 1/72569* (2013.01); *H04M 3/4288* (2013.01); *H04W 76/00* (2013.01); *H04M 2250/12* (2013.01); *H04W 4/008* (2013.01)

(58) Field of Classification Search
CPC ...... H04W 4/16; H04W 76/00; H04M 1/0241; H04M 1/0212; H04M 1/0235
See application file for complete search history.

(56) References Cited

U.S. PATENT DOCUMENTS

2009/0262052 A1* 10/2009 Yang .................... G09G 3/3406 345/84
2010/0167795 A1* 7/2010 Huang .............. H04M 1/72563 455/567
2010/0304757 A1* 12/2010 Yoshioka ............... G01B 21/02 455/456.1

(Continued)

*Primary Examiner* — Asghar Bilgrami
(74) *Attorney, Agent, or Firm* — The Farrell Law Firm, P.C.

(57) ABSTRACT

A call switching method and a mobile device are provided that rapidly and conveniently switch calls. The method includes establishing, by the mobile device, a first call with a first device; receiving, by the mobile device, a request for a second call from a second device, during the first call; informing a user of the mobile device of the call request; determining, by the mobile device, whether the user moves the mobile device from a first ear to a second ear; and accepting, by the mobile device, the second call with the second device, when the mobile device is moved from the first ear to the second ear.

24 Claims, 8 Drawing Sheets

(56) References Cited

U.S. PATENT DOCUMENTS

| | | | | |
|---|---|---|---|---|
| 2013/0035139 A1* | 2/2013 | Sheynblat | ............. | G06F 1/1626 455/566 |
| 2013/0310110 A1* | 11/2013 | Forutanpour | ......... | H04W 88/02 455/556.1 |
| 2014/0099992 A1* | 4/2014 | Burns | .................... | G06F 3/044 455/550.1 |

\* cited by examiner

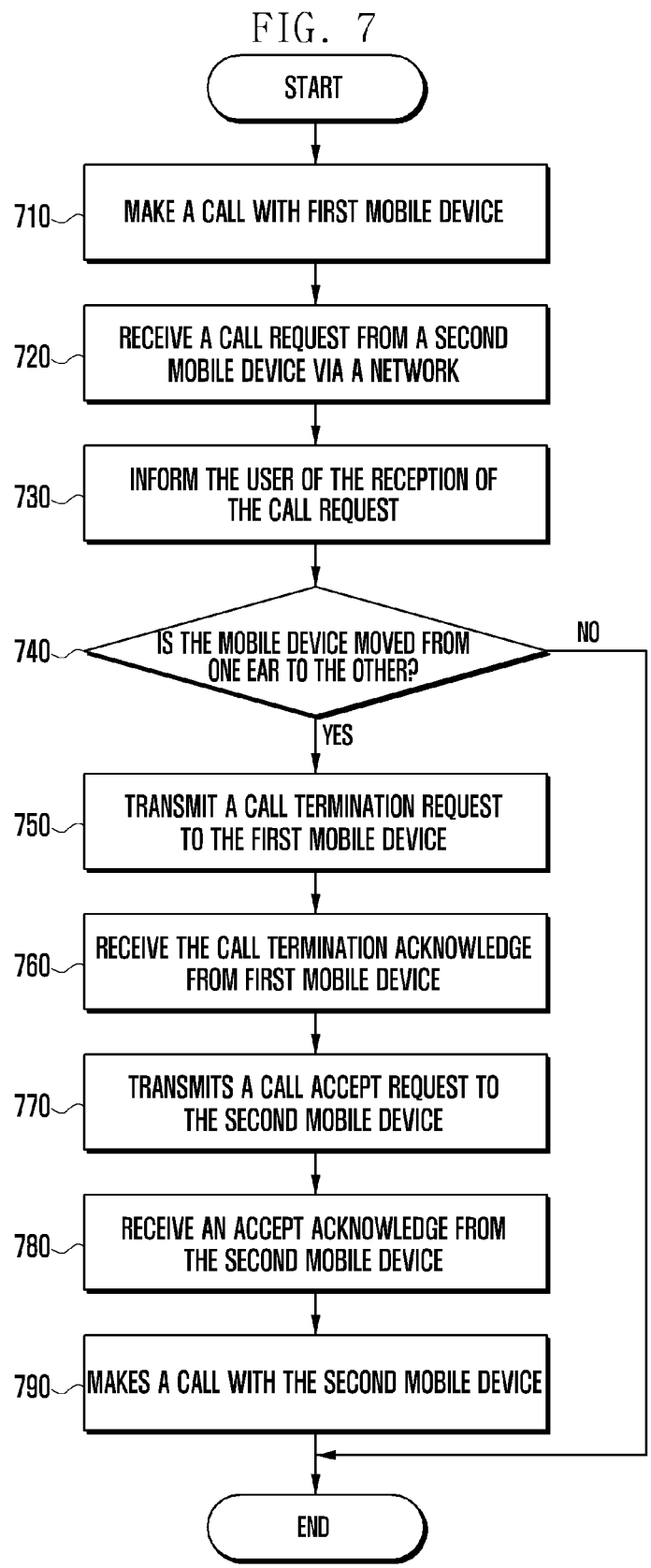

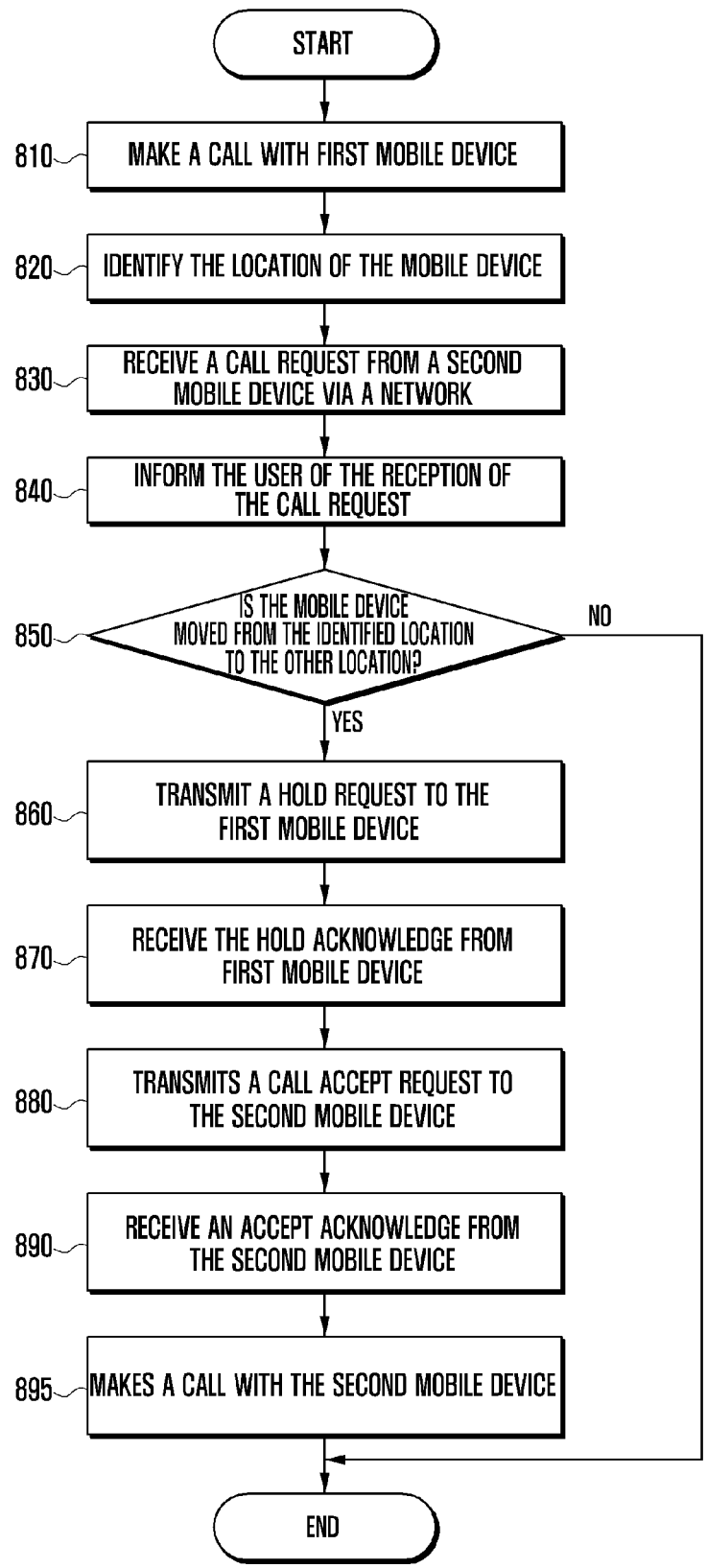

METHOD AND APPARATUS FOR PERFORMING CALL SWITCHING

PRIORITY

This application is a continuation of U.S. patent application Ser. No. 13/872,798, which was filed in the U.S. Patent and Trademark Office on Apr. 29, 2013, and claims priority under 35 U.S.C. §119(a) to Korean Patent Application Serial No.: 10-2012-0130334, which was filed in the Korean Intellectual Property Office on Nov. 16, 2012, the entire disclosure of each of which is hereby incorporated by reference.

BACKGROUND OF THE INVENTION

1. Field of the Invention

This invention relates generally to a method and a mobile device for switching from a first call to a second call, when the mobile device receives a call request message for the second call via a network, while the first call is established.

2. Description of the Related Art

FIG. 1 is a flow chart illustrating a conventional call switching method.

Referring to FIG. 1, mobile device A is engaged in a call with mobile device B in step 110. During the call, mobile device A receives a call request from mobile device C via the network (e.g., from a base station) in step 120.

Mobile device A then informs its user A of mobile device C's received call request, e.g., by displaying it via text, outputting a voice announcement, etc.

When user A wants to answer the incoming call from mobile device C, mobile device A detects a key signal of Hold & Switch key in step 130. For example, user A presses the Hold & Switch key, which creates a key signal that is transferred to a controller. The controller then detects the Hold & Switch key signal.

In step 140, mobile device A transmits a Hold request to mobile device B. In step 150, mobile device B transmits a Hold acknowledge to the mobile device A.

In step 160, mobile device A transmits an Accept Request to mobile device C, and in step 170, mobile device C transmits an Accept Acknowledge to mobile device A. Therefore, mobile device A establishes a call with mobile device C in step 180.

As described above, the conventional call switching method illustrated in FIG. 1 requires a user to perform actions, e.g., one or more key pressing operations. These user actions take time for a mobile device to provide call services, often inconveniencing the user.

Further, if the user does not enter the action in the mobile device quick enough, the mobile device misses the second call (i.e., the call from the mobile device C).

SUMMARY OF THE INVENTION

Accordingly, the present invention is designed to address at least the problems and/or disadvantages described above and to provide at least the advantages described below.

An aspect of the present invention is to provide a method for a mobile device to rapidly and easily switch between calls.

Another aspect of the present invention is to provide a mobile device adapted to the above-identified call switching method.

In accordance with an aspect of the present invention, a call switching method is provided, which includes establishing, by the mobile device, a first call with a first device; receiving, by the mobile device, a request for a second call from a second device, during the first call; informing a user of the mobile device of the call request; determining, by the mobile device, whether the user moves the mobile device from a first ear to a second ear; and accepting, by the mobile device, the second call with the second device, when the mobile device is moved from the first ear to the second ear.

BRIEF DESCRIPTION OF THE DRAWINGS

The above and other aspect, features, and advantages of certain embodiments of the present invention will become more apparent from the following detailed description viewed in conjunction with the accompanying drawings, in which:

FIG. 7 is a flow chart illustrating a call switching method according to an embodiment of the present invention; and FIG. 8 is a flow chart illustrating a call switching method according to an embodiment of the present invention.

DETAILED DESCRIPTION OF EMBODIMENTS OF THE PRESENT INVENTION

Hereinafter, various embodiments of the present invention are described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness Herein, the term "mobile device" refers to a mobile electronic device that establishes a call with other electronic devices via a network, e.g., smart phones, tablet Personal Computers (PCs), laptop computers, etc.

Figure 1:
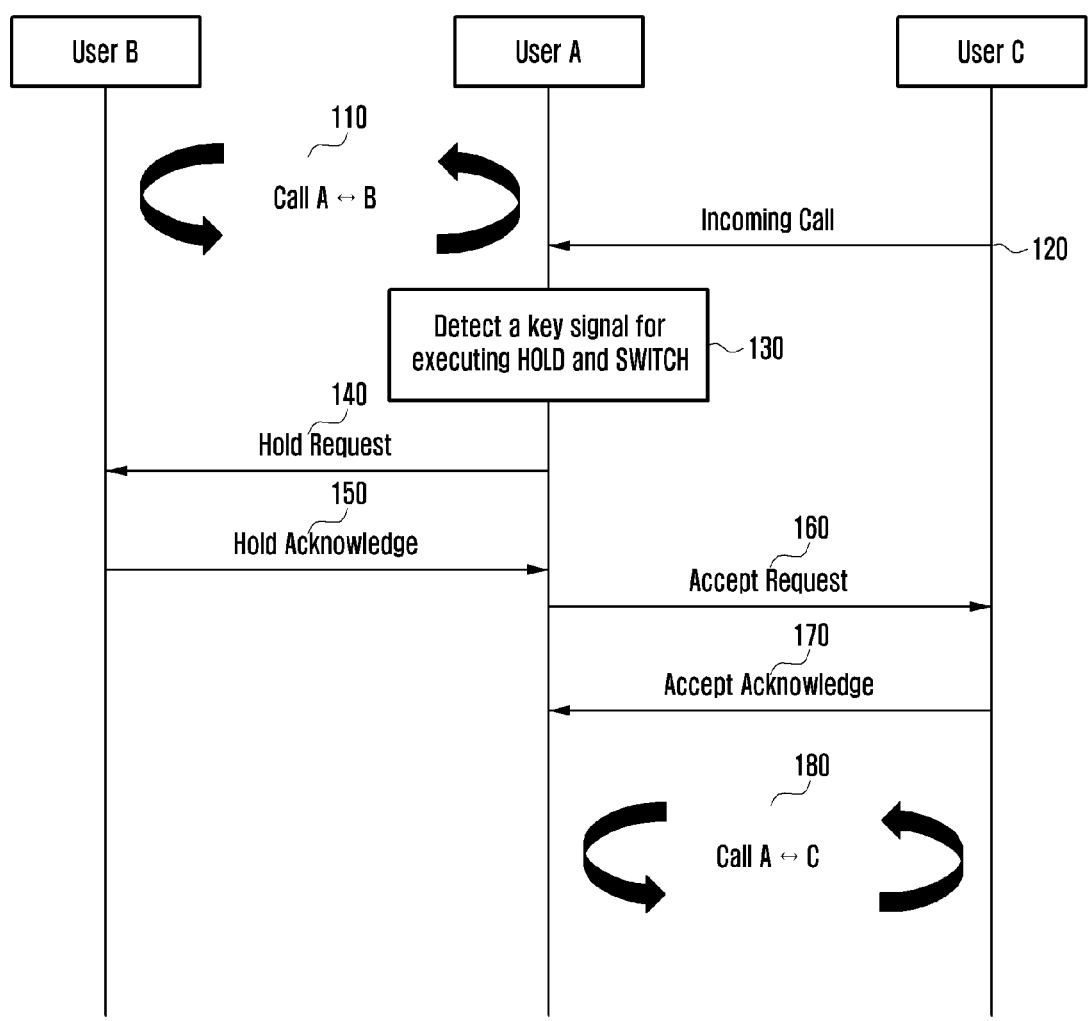
FIG. 1 is a flow chart illustrating a conventional call switching method.
Figure 2:
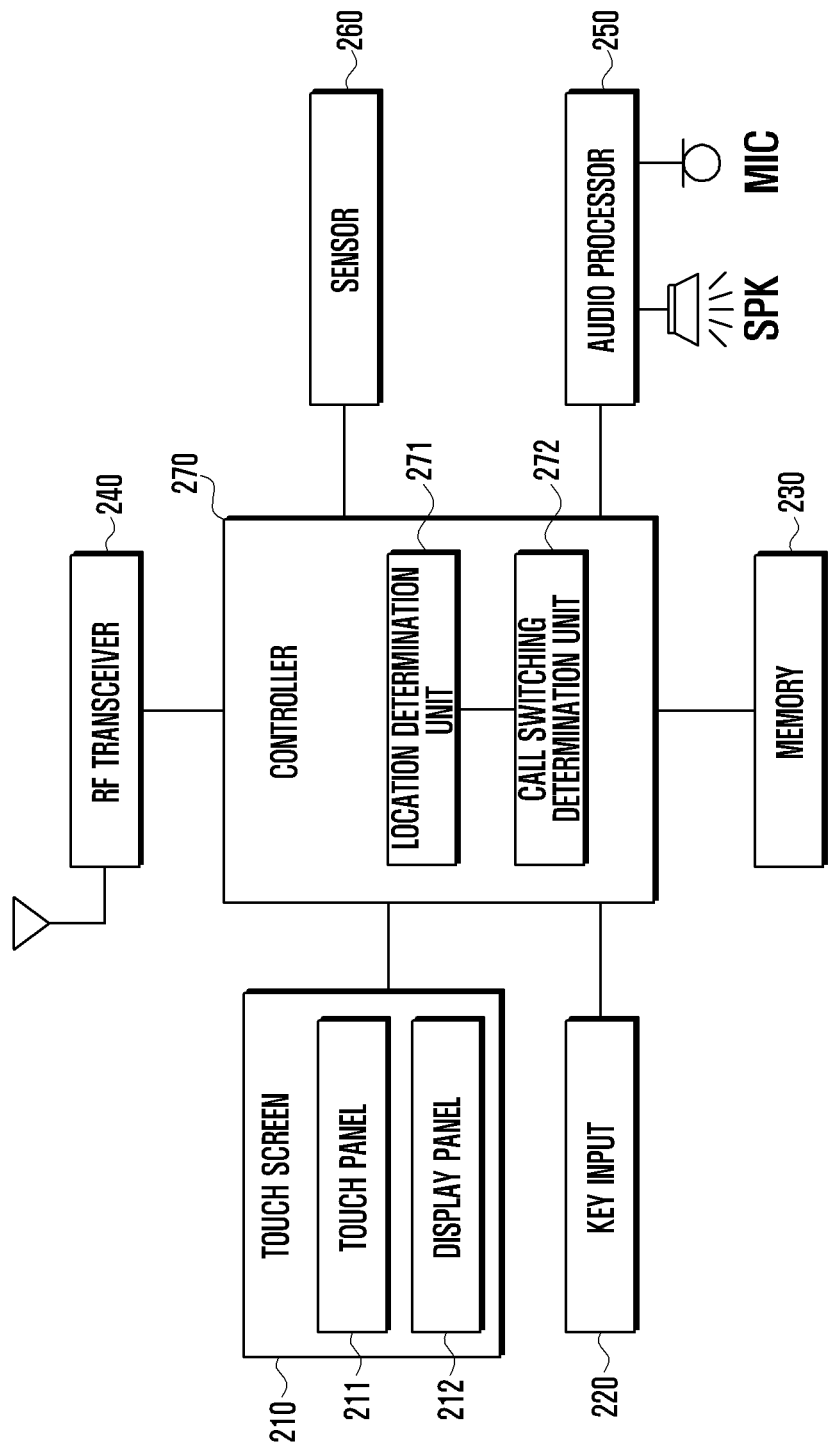
FIG. 2 illustrates a mobile device according to an embodiment of the present invention.

FIG. 2 illustrates a mobile device according to an embodiment of the present invention.

Referring to FIG. 2, the mobile device includes a touch screen 210, a key input 220, a memory 230, a Radio Frequency (RF) transceiver 240, an audio processor 250, a speaker (SPK), a microphone (MIC), a sensor 260, and a controller 270.

The touch screen 210 includes a touch panel 211 and a display panel 212. The touch panel 211 is placed on the display panel 212 and may be implemented with an add-on type of touch panel placed on the display panel 212, or an on-cell type or in-cell type of touch panel inserted in the display panel 212, etc.

The touch panel 211 creates an analog signal when a touch event occurs thereon, converts the analog signal to a digital signal, and transfers the digital signal to the controller 270.

A signal corresponding to a touch event includes touch coordinates (x, y). Accordingly, when the controller 270 receives a touch coordinate from the touch panel 211, it concludes that an object (e.g., finger or stylus pen) touched the touch panel 211. When the controller 270 does not receive a touch coordinate from the touch panel 211, it concludes that a touch input has not been entered via the touch panel 211.

The controller 270 detects a touch moving on the touch panel 211. For example, when the controller 270 detects that a touch coordinate (x1, y1) changes to (x2, y2), it concludes that the touch has been moved. The controller 270 then calculates a variation in location of a touch (dx, dy).

As described above, the controller 270 identifies touch inputs. The touch inputs refer to user gestures on the touch panel 211, e.g., a touch, a multi-touch, a tap, a double tap, a long tap, a tap & touch, a drag, a flick, a press, a pinch in/out, etc.

The touch panel 211 includes pressure sensors, which detect pressure on touched locations, and transfers detected pressure signals to the controller 270. The controller 270 distinguishes between a touch and a press via the detected pressure signals.

The display panel 212 displays screen data, e.g., images and text, under the control of the controller 270. Accordingly, the display panel 212 displays a variety of screens according to the operations of the mobile device, e.g., a lock screen, a home screen, an application execution screen, a keypad screen, etc. The display panel 212 may be implemented with a Liquid Crystal Display (LCD), a panel with Organic Light Emitting Diodes (OLEDs), a panel with Active Matrix Organic Light Emitting Diodes (AMOLEDs), a flexible display, etc.

The key input 220 includes a number of keys that receive numbers and letters and set a variety of functions in the mobile device. The key input 220 creates key events, i.e., key signals related to user settings and function controls of the mobile device, and transfers them to the controller 270. Examples of the key signals include a signal for turning on/off the mobile device, a signal for adjusting the volume, a signal for turning on/off the screen, a signal for operating a camera (not shown), etc.

The controller 270 controls corresponding components according to the created key signals. The key input 220 may include a hard key, i.e., a physical key. A virtual key (or soft key) is displayed on the touch screen 210.

The memory 230, for example, includes a disk, a Random Access Memory (RAM), a Read Only Memory (ROM), a Flash memory, etc. The memory 230 stores data created in the mobile device, and data received from an external system (e.g., a server, a desk top PC, a tablet PC, etc.) via the RF transceiver 240 or an interface (not shown), under the control of the controller 270.

The memory 230 stores a booting program, an Operating System (OS), a touch screen controller, a location determination program, a call switching program, etc. The touch screen controller is operated based on the OS and controls the operations of the touch screen 210. The location determination program determines a location of the mobile device, and in accordance with an embodiment of the present invention, determines whether the mobile device is positioned near the right or left ear of the user using a signal detected via the sensor 260.

When the mobile device, during a first call, receives a request for a second call, the call switching program switches the first call to the second call, based on the location information regarding the mobile device. For example, if the user moves the mobile device during the first call from the left ear to the right ear, after receiving the request for the second call, the call switching program holds or terminates the first call, and then accepts the second call.

The memory 230 may also include embedded applications and third party applications. For example, the embedded application may be a browser, an e-mail application, an instant messenger, a touch screen controller, etc. The third party applications refer to applications that can be downloaded from online markets and installed to the mobile device.

The RF transceiver 240 performs a voice/video call, data communication, with external systems, via a network, under the control of the controller 270. More specifically, the RF transceiver 240 includes an RF transmitter for up-converting the frequency of signals to be transmitted and amplifying the signals, and an RF receiver for low-noise amplifying received RF signals and down-converting the frequency of the received RF signals. The RF transceiver 240 includes a mobile communication module (e.g., a 3-Generation (3G) mobile communication module, 3.5G, 4G, etc.), a digital broadcasting module (e.g., a Digital Multimedia Broadcasting (DMB) module), a short-range communication module (e.g., Wi-Fi module, Bluetooth module, Near Field Communication (NFC) module), etc.

The audio processor 250 performs, via the speaker (SPK) and microphone (MIC), the input and output of audio signals (e.g., voice data) for performing a speech recognition process, a voice recording process, a digital recording process, and a video/voice calling process. The audio processor 250 covers audio signals that are output from the controller 270 into analog signals, amplifies the signals, and outputs the amplified signals via the speaker (SPK). The audio processor 250 also converts audio signals that input via the microphone (MIC) into digital signal, and transfers the signals to the controller 270.

In accordance with an embodiment of the present invention, the mobile device includes first and second speakers, where the first speaker, i.e., an earpiece speaker, is located at the user's ear when the user is making a call, and the second speaker, e.g., a loud speaker, is used to play back media data, such as music, videos, etc., as well as to make a call.

The sensor 260 detects physical quantities (e.g., light, velocity, acceleration, altitude, gravity, etc.) or changes in physical quantity, creates corresponding signals, and transfers the signals to the controller 270. The controller 270 determines the location of the mobile device based on the received detected signals. Accordingly, the sensor 260 may include a variety of sensors, e.g., an acceleration sensor, a gyro sensor, a luminance sensor, an orientation sensor, a proximity sensor, a pressure sensor, an image sensor, etc. The sensor 260 may be implemented with one chip where a number of sensors (e.g., Sensor 1, Sensor 2, Sensor 3, etc.) are integrated. Alternatively, the sensor 260 may be implemented with a number of sensors that are formed as chips respectively.

The controller 270 controls the entire operation of the mobile device and the signals flowing among the components therein. The controller 270 processes data.

The controller 270 also controls the electric power supplied to the components from the battery. The controller 190 includes main memory devices, cache memory devices, a Central Processing Unit (CPU), a Graphics Processing Unit (GPU), etc. The main memory devices store the booting program, the OS, applications, etc. The cache memory devices temporarily store data that will be written in the memory 230 and are read therefrom. The OS interfaces between hardware and applications or between applications and manages resources such as CPU, GPU, main memory devices, auxiliary memory devices, etc. The OS controls the operations of hardware and the execution of applications, schedules tasks in the user device, controls the operations in CPU and GPU, controls the storage of data and files, etc. The CPU serves as a key control unit in a computer system that performs operation and comparison of data, analysis and execution of instructions, etc. The GPU serves to perform operation and comparison of data related to graphics, analysis and execution of instructions, etc., instead of CPU. CPUs and GPUs may be respectively implemented with one package or a single IC chip where two or more cores (e.g., quad-core) are integrated.

Alternatively, a CPU and a GPU may be integrated with a single chip (System on Chip (SoC)). Alternatively, a CPU and a GPU may be packaged form multi-layers. The configuration including a CPU and a GPU is called an Application Processor (AP).

The controller 270 receives a proximity signal from a proximity sensor of the sensor 260 while making a call, and determines if the mobile device is positioned near the user's ear.

More specifically, the proximity sensor creates a proximity signal when it detects an object getting close thereto, and transfers the signal to the controller 270. For example, controller 270 receives a roll angle $\Phi$, a pitch angle $\theta$, and a yaw angle $\psi$ from the orientation sensor of the sensor 260. The roll angle $\Phi$, pitch angle $\theta$, and yaw angle $\psi$ refer to angles with respect to X-axis, Y-axis, and Z-axis, respectively.

The controller 270 then calculates 3 dimensional coordinates (x, y, z) of the mobile device using the received angles with respect to the X-axis, Y-axis, and Z-axis. The controller 270 determines whether the mobile device is positioned near the user's right or left ear, based on the calculated 3 dimensional coordinates (x, y, z).

If the controller does not receive a proximity signal from the proximity sensor, while the mobile device is making a call, it concludes that the mobile device is not positioned near the user's ear, e.g., when the user is making a call using earphones connected to an earphone jack or through a Bluetooth headset.

Alternatively, when the user is making a call with the mobile device via the first speaker, as described above, the controller 270 concludes that the mobile device is positioned near the user's ear Thereafter, the controller 270 determines whether the mobile device is located near the user's right or left ear, based on the calculated 3 dimensional coordinates (x, y, z).

However, when the user is making a call with the mobile device via the second speaker, i.e., loudspeaker, the controller 270 concludes that the mobile device is not positioned near the user's ear.

As another example, when the user is making a call with the mobile device via earphones, i.e., when the mobile device establishes a call and is connected with the earphones in a wired mode (or via a Bluetooth module in a wireless mode), the controller 270 concludes that the mobile device is not positioned near the user's ear.

As described above, during a first call, when the mobile device receives a call request for a second call, the controller 270 switches the first call to the second call, based on the location information regarding the mobile device. For example, when the user moves the mobile device from the left ear to the right ear, after receiving the call request for the second call, the controller 270 holds or terminates the first call and then accepts the second call.

With the convergence of digital devices, there may be many digital devices and modifications thereof, not specifically described in the application. However, it will be appreciated that the many digital devices and modifications thereof can also be included in the mobile device. For example, the mobile device may further include a Global Positioning Satellite (GPS) module, a vibration motor, a camera module, accessories, external interface (e.g., earphone jack), etc. The accessories refer to parts that can be used with the mobile device, e.g., a stylus pen, etc. Also, it will be appreciated that, according to the purposes, the mobile device may be implemented by omitting a particular element from the configuration illustrated in FIG. 2 or replacing it with other elements.

Figure 3:
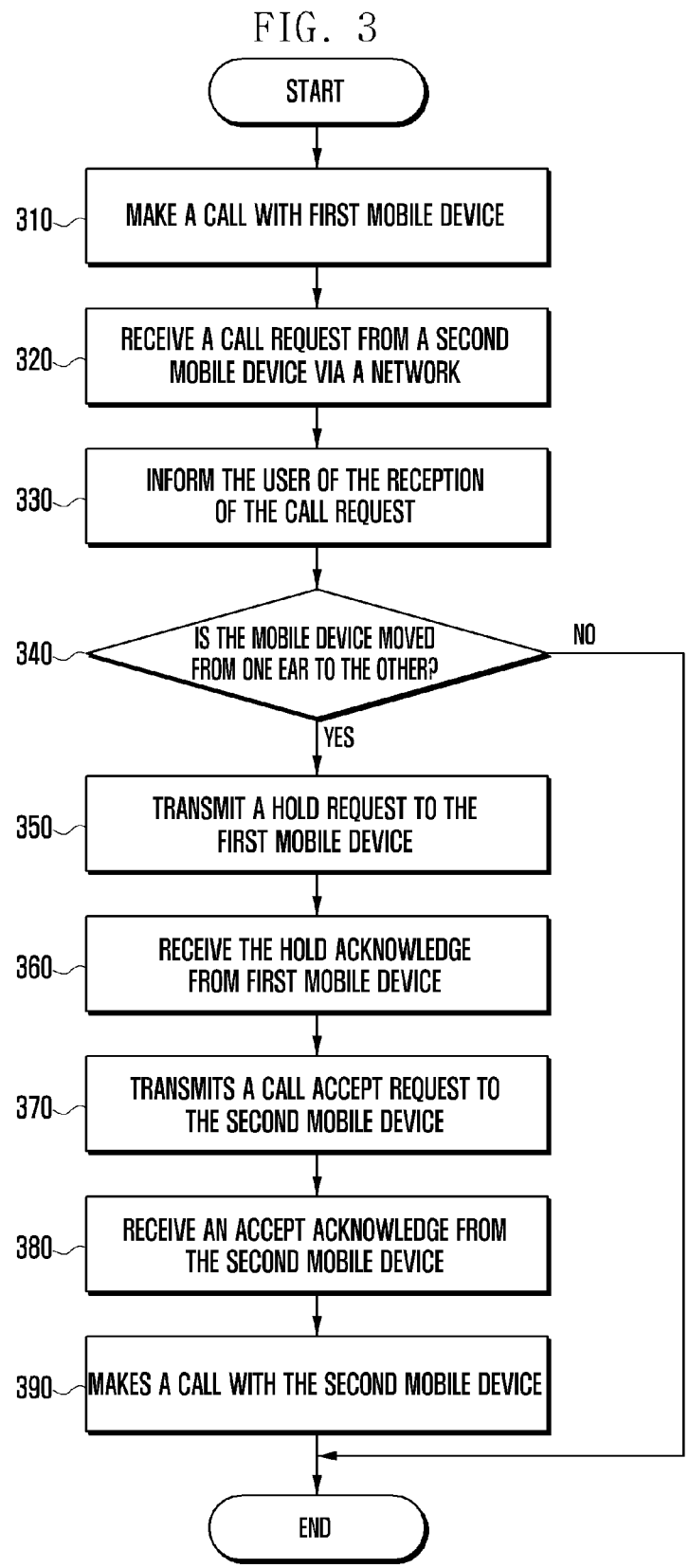
FIG. 3 is a flow chart illustrating a call switching method according to an embodiment of the present invention.

FIG. 3 is a flow chart illustrating a call switching method according to an embodiment of the present invention.

Referring to FIG. 3, the controller 270 controls the mobile device to makes a call with a first mobile device, by controlling the RF transceiver 240 and the audio processor 250 in step 310. Specifically, the controller 270 controls the RF transceiver 240 to transmit/receive voice data to/from the first mobile device. The controller 270 receives voice data via the RF transceiver 240 and transfers it to the audio processor 250. The controller 270 receives voice data from the audio processor 250 and transfers it to the RF transceiver 240.

While the mobile device is making the call with the first mobile device, the controller 270 receives a call request from a second mobile device via the RF transceiver 240 in step 320. In step 330, the controller 270 informs the user of the reception of the call request. For example, if the mobile device receives a call request, the controller 270 controls a vibration motor to operate, the audio processor 250 to output a corresponding voice announcement via the speaker (SPK), or the touch screen 210 to output a corresponding text message.

In step 340, the controller 270 determines whether the user moves the mobile device from one ear to the other ear.

Figure 4:
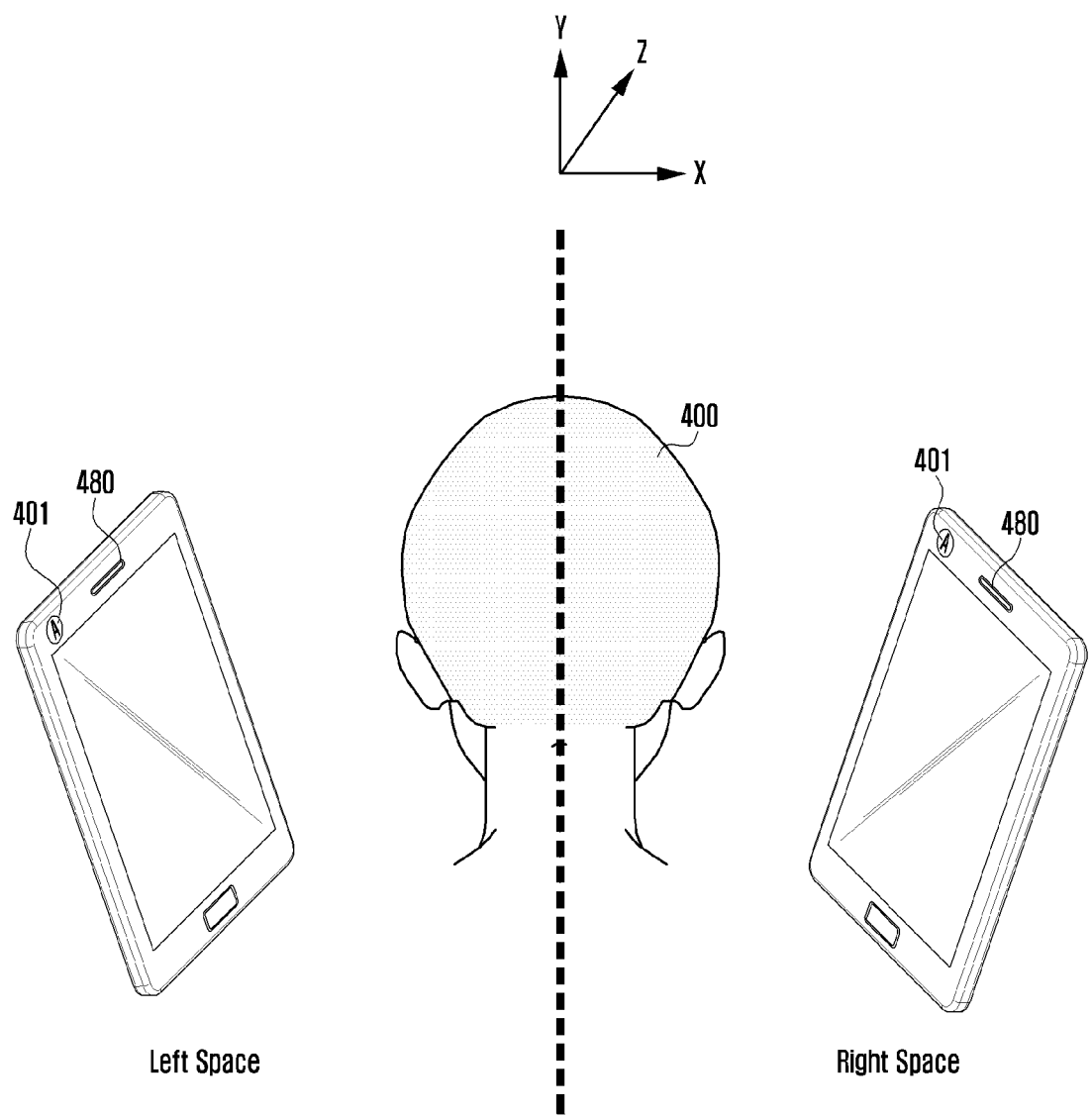
FIG. 4 illustrates locations of a mobile device with respect to a user, according to an embodiment of the present invention.

FIG. 4 illustrates locations of a mobile device with respect to a user, according to an embodiment of the present invention.

Referring to FIG. 4, the mobile device may be located at the left space and right space with respect to a user 400 or Y-axis. Herein, it is assumed that the mobile device includes an orientation sensor for detecting a location where it is located with respect to the user. Thereafter, the controller 270 calculates 3 dimensional coordinates (x, y, z) of the letter 'A' 401, which is printed near a first speaker 480.

As illustrated in FIG. 4, if the mobile device is located near the user's left ear or in the left space, the letter 'A' 401 is located at the left of the first speaker 480. However, if the mobile device is located near the user's right ear or in the right space, the letter 'A' 401 is located to the right of the first speaker 480.

When the controller 270 ascertains that the mobile device is located near the user's ear, it then determines whether the mobile device is located at the user's right or left ear, based on the three dimensional coordinates (x, y, z) of the letter 'A' 401, calculated via the orientation sensor. For example, if the calculated coordinates are (37, −20, 67), the controller 270 ascertains that the mobile device is located near the user's left ear. If the calculated coordinates are (300, −19, −96), the controller 270 ascertains that the mobile device is located near the user's right ear. If x and y vary over a first error range (e.g., ±10) and a second error range (e.g., ±10) respectively and z varies in a third error range (e.g., ±10), the controller 270 ascertains that the mobile device moves from one ear to the other.

Referring again to FIG. 3, when the controller 270 ascertains that the user moves the mobile device from one ear to the other ear in step 340, the controller 270 controls the RF transceiver 240 to transmit a Hold Request for holding the current call with the first mobile device to the network in step 350. In step 360, the controller 270 receives a Hold Acknowledge from the network via the RF transceiver 240.

In step 370, the controller 270 controls the RF transceiver 240 to transmit the call Accept Request with a second mobile device to the network, and in step 380, the controller 270 receives the call Accept from the network via the RF transceiver 240. In step 390, the controller 270 controls the RF transceiver 240 and the audio processor 250 to make a call with the second mobile device.

Figure 5:
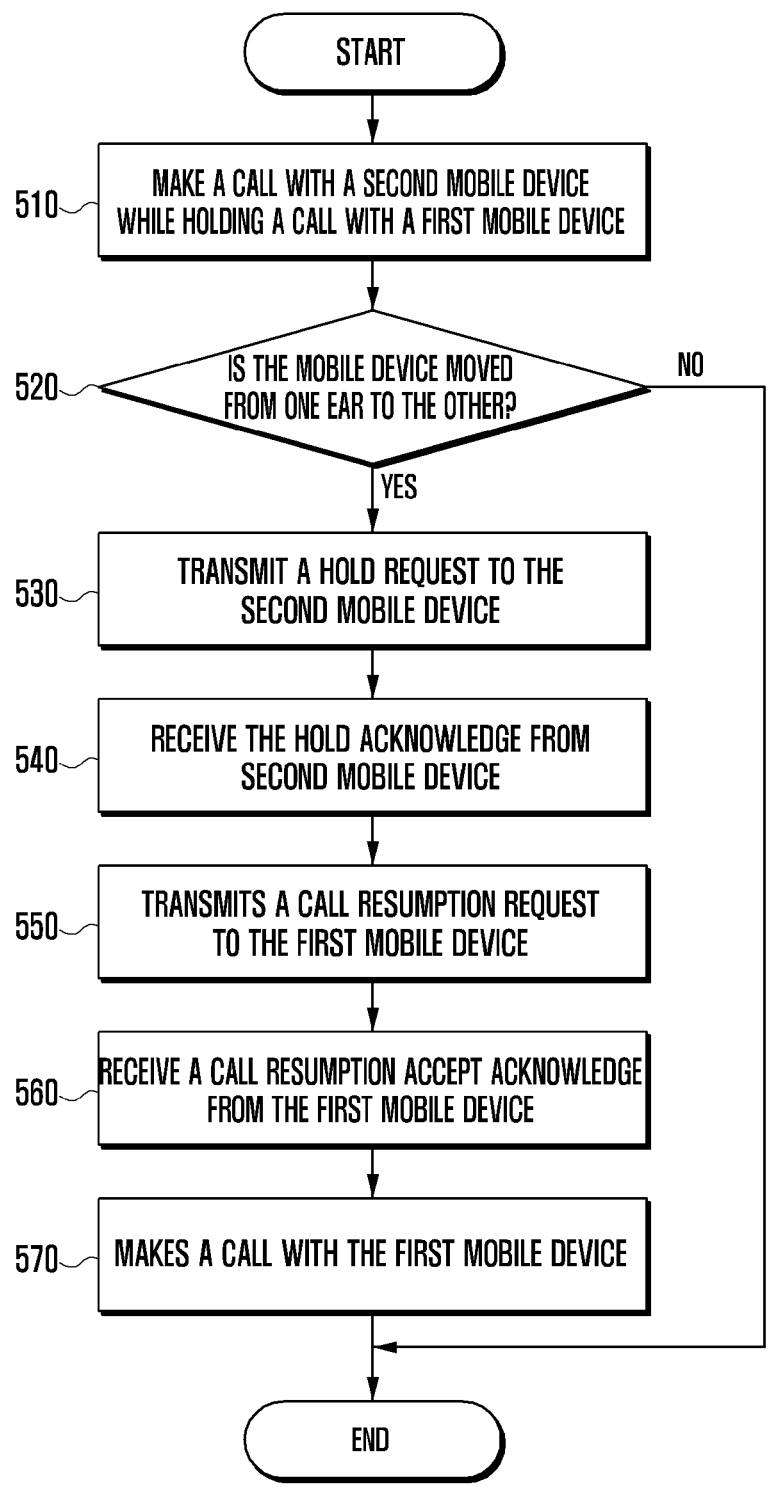
FIG. 5 is a flow chart illustrating a call switching method according to an embodiment of the present invention.

FIG. 5 is a flow chart illustrating a call switching method according to an embodiment of the present invention.

Referring to FIG. 5, in step 510, the controller 270 makes a call with a second mobile device, while the mobile device is holding a call with a first mobile device. The controller 270 determines whether the user moves the mobile device 200 from one ear to the other in step 520.

When the controller 270 ascertains that the user moves the mobile device from one ear to the other in step 520, it controls the RF transceiver 240 to transmit a Hold Request to the second mobile device in step 530. The controller 270 receives the Hold Acknowledge from the network via the RF transceiver 240 in step 540.

In step 550, the controller 270 controls the RF transceiver 240 to transmit a call Resumption Request to the first mobile device. In step 560, the controller 270 receives the call Resumption Accept Acknowledge from the first mobile device, and in step 570, the controller 270 controls the RF transceiver 240 and the audio processor 250 to make a call with the first mobile device.

Figure 6:
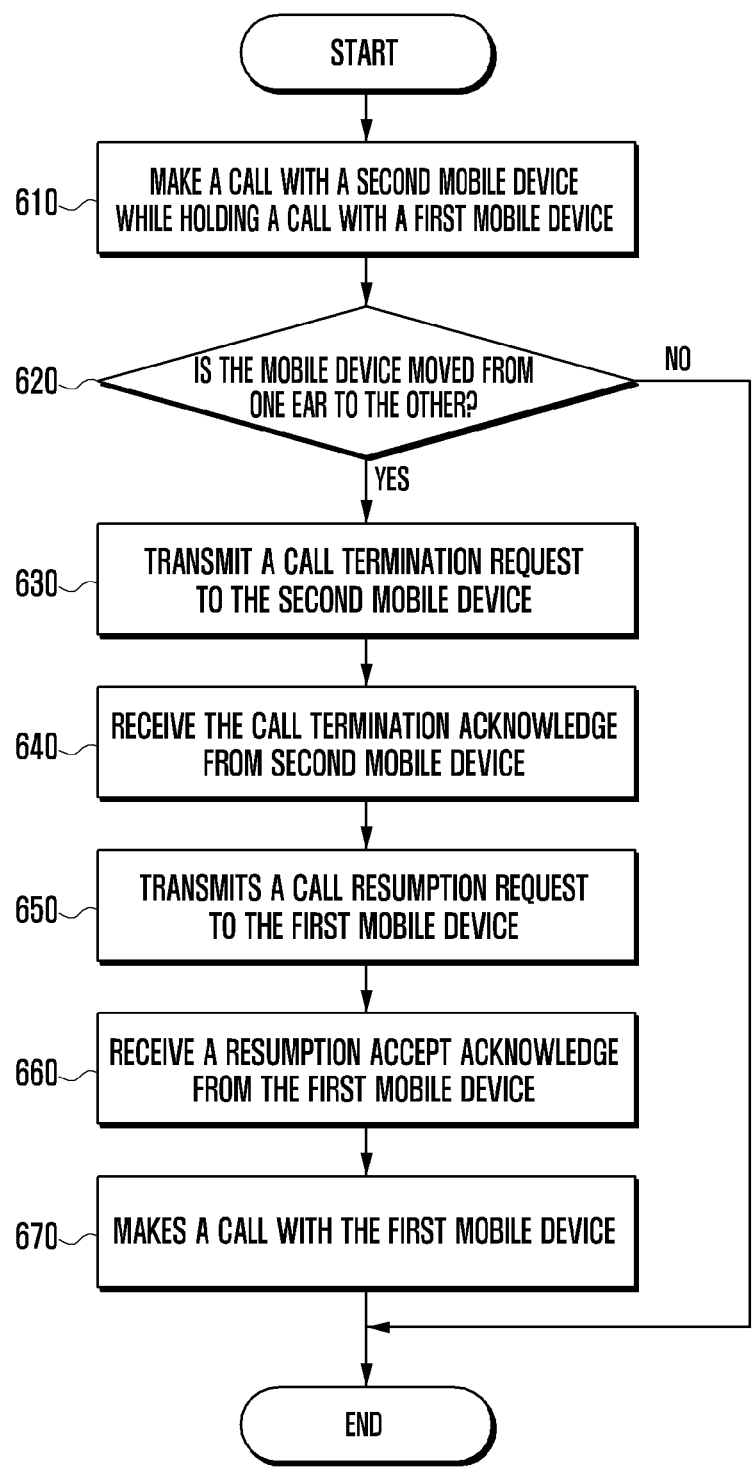
FIG. 6 is a flow chart illustrating a call switching method according to an embodiment of the present invention.

FIG. 6 is a flow chart illustrating a call switching method according to an embodiment of the present invention.

Referring to FIG. 6, in step 610, the controller 270 makes a call with a second mobile device, while the mobile device is holding a call with a first mobile device. In step 620, the controller 270 determines whether the user moves the mobile device from one ear to the other.

When the controller 270 ascertains that the user moves the mobile device from one ear to the other in step 620, it controls the RF transceiver 240 to transmit a call Termination Request to the second mobile device in step 630. The controller 270 receives the call Termination Acknowledge from the network via the RF transceiver 240 in step 640. The controller 270 controls the RF transceiver 240 to transmit a call Resumption Request to the first mobile device in step 650.

In step 660, the controller 270 receives the call Resumption Accept Acknowledge from the first mobile device, and in step 670, the controller 270 controls the RF transceiver 240 and the audio processor 250 to make a call with the first mobile device.

FIG. 7 is a flow chart illustrating a call switching method according to an embodiment of the present invention.

Referring to FIG. 7, in step 710, the controller 270 controls the RF transceiver 240 and the audio processor 250 to make a call to a first mobile device. In step 720, the controller 270 receives a call request from a network via the RF transceiver 240. In step 730, the controller 270 informs the user of the reception of the call request. In step 740, the controller 270 determines whether the user moves the mobile device from one ear to the other ear.

When the controller 270 ascertains that the user moves the mobile device from one ear to the other ear in step 740, it controls the RF transceiver 240 to transmit a call Termination Request to the first mobile device via the network in step 750. In step 760, the controller 270 receives the call Termination Acknowledge from the network via the RF transceiver 240, and in step 770, the controller 270 controls the RF transceiver 240 to transmit the call Accept Request with a second mobile device to the network.

In step 780, the controller 270 receives the call Accept from the network via the RF transceiver 240, and in step 790, the controller 270 controls the RF transceiver 240 and the audio processor 250 to make a call with the second mobile device.

FIG. 8 is a flow chart illustrating a call switching method according to an embodiment of the present invention.

Referring to FIG. 8, in step 810, the controller 270 controls the mobile device to make a call with a first mobile device. In step 820, the controller 270 identifies the location of the mobile device during the call. For example, if the mobile device is making a video call with the first mobile device, the controller 270 ascertains that the mobile device 200 is not located close to the user's ear.

In step 830, the controller 270 receives a call request from a network via the RF transceiver 240, and in step 840, the controller 270 informs the user of the reception of the call request.

In step 850, the controller 270 determines whether the user moves the mobile device from the identified location to another location. For example, if the controller 270 receives a signal from a proximity sensor, it concludes that the mobile device has been moved near the user's ear.

When the controller 270 ascertains that the user moves the mobile device in step 850, it controls the RF transceiver 240 to transmit a call Hold Request to the first mobile device via the network in step 860.

In step 870, the controller 270 receives the call Hold Acknowledge from the network via the RF transceiver 240, and in step 880, the controller 270 controls the RF transceiver 240 to transmit the call Accept Request with a second mobile device to the network.

In step 890, the controller 270 receives the call Accept from the network via the RF transceiver 240, and in step 895, the controller 270 controls the RF transceiver 240 and the audio processor 250 to make a call with the second mobile device.

As described above, a call switching method and the mobile device according to an embodiment of the invention can rapidly and easily switch calls without receiving commands entered by a user via buttons or a touch screen.

As described above, a call switching method according to an embodiment of the present invention can be implemented with program commands that can be conducted via various types of computers and recorded in computer-readable recording media. The computer-readable recording media contain program commands, data files, data structures, or the like, or a combination thereof. The program commands recorded in the recording media may be designed or configured to comply with the invention or may be software well known to the ordinary person skilled in the art.

The computer-readable recoding media includes hardware systems for storing and conducting program commands. Examples of the hardware systems are magnetic media such as a hard disk, floppy disk, a magnetic tape, optical media such as Compact Disc (CD)-ROM and Digital Versatile Discs (DVDs), Magneto-Optical Media, such as a floptical disk, ROM, RAM, flash memory, etc.

The program commands include assembly language or machine code complied by a complier and a higher level language interpreted by an interpreter.

Although certain embodiments of the present invention have been described in detail hereinabove, it should be understood that many variations and modifications of the basic inventive concept herein described, which may be apparent to those skilled in the art, will still fall within the spirit and scope of the embodiments of the present invention as defined in the appended claims and their equivalents.

What is claimed is:

1. A method for switching between functions by a mobile device, the method comprising:
   performing, by the mobile device, a first function;
   receiving, by the mobile device, an event for a second function that is different from the first function, while performing the first function;
   outputting, by the mobile device, a notification corresponding to the event, in response to receiving the event;
   detecting, by the mobile device, a movement of the mobile device, after outputting the notification;
   determining, by the mobile device, whether the detected movement satisfies a predetermined condition; and
   performing, by the mobile device, the second function, in response to determining that the detected movement satisfies the predetermined condition.

2. The method of claim 1, wherein performing the first function comprises establishing a first call with a first call user.

3. The method of claim 2, wherein performing the second function comprises establishing a second call with a second call user.

4. The method of claim 3, further comprising placing the first call on hold, before establishing the second call with the second call user.

5. The method of claim 3, wherein establishing the second call with the second call user comprises answering an incoming call received from the second call user.

6. The method of claim 5, further comprising displaying, by the mobile device, an indication of the incoming call received from the second call user.

7. The method of claim 3, further comprising terminating the first call, before establishing the second call with the second call user.

8. The method of claim 1, wherein performing the first function comprises:
   establishing a first call with a first call user;
   placing the first call on hold; and
   establishing a second call with a second call user.

9. The method of claim 8, wherein performing the second function comprises resuming the first call with the first call user.

10. The method of claim 9, further comprising placing the second call on hold, before resuming the first call with the first call user.

11. The method of claim 9, further comprising terminating the second call, before resuming the first call with the first call user.

12. The method of claim 1, wherein determining whether the movement of the mobile device satisfies the predetermined condition comprises:
   determining whether x and y components of three dimensional coordinates of the mobile device vary over first and second preset error ranges, respectively;
   determining whether a z component of the three dimensional coordinates of the mobile device varies within a third preset error range; and
   determining that the movement of the mobile device satisfies the predetermined condition, when the x and y components of the three dimensional coordinates of the mobile device vary over the first and second preset error ranges, respectively, and the z component varies within the third preset error range.

13. A mobile device comprising:
   a sensor that senses physical quantities related to a location of the mobile device; and
   a controller that:
   performs a first function,
   receives an event for a second function that is different from the first function, while the first function is being performed,
   outputs a notification corresponding to the event, in response to receiving the event,
   detects, based on the sensed physical quantities from the sensor, a movement of the mobile device, after outputting the notification,
   determines whether the detected movement satisfies a predetermined condition, and
   performs a second function, in response to determining that the detected movement satisfies the predetermined condition.

14. The mobile device of claim 13, further comprising a transceiver,
   wherein the controller performs the first function by establishing a first call with a first call user via the transceiver.

15. The mobile device of claim 14, wherein the controller performs the second function by establishing a second call with a second call user via the transceiver.

16. The mobile device of claim 15, wherein the controller places the first call on hold, before establishing the second call with the second call user.

17. The mobile device of claim 15, wherein the controller establishes the second call with the second call user by answering an incoming call received from the second call user.

18. The mobile device of claim 17, further comprising a display that displays an indication of the incoming call received from the second call user.

19. The mobile device of claim 15, wherein the controller terminates the first call, before establishing the second call with the second call user.

20. The mobile device of claim 13, wherein the controller performs the first function by establishing a first call with a first call user, placing the first call on hold, and establishing a second call with a second call user.

21. The mobile device of claim 20, wherein the controller performs the second function by resuming the first call with the first call user.

22. The mobile device of claim 21, wherein the controller places the second call on hold, before resuming the first call with the first call user.

23. The mobile device of claim 21, wherein the controller terminates the second call, before resuming the first call with the first call user.

24. The mobile device of claim 13, wherein the controller determines whether the movement of the mobile device satisfies the predetermined condition by determining whether x and y components of three dimensional coordinates of the mobile device vary over first and second preset error ranges, respectively, determining whether a z component of the three dimensional coordinates of the mobile device varies within a third preset error range, and determining that the movement of the mobile device satisfies the predetermined condition, when the x and y components of the three dimensional coordinates of the mobile device vary over the first and second preset error ranges, respectively, and the z component varies within the third preset error range.

* * * * *